INVENTORS.
ROBERT H. ELLIS
PETER A. LUND
ATTORNEY.

United States Patent Office 3,438,296
Patented Apr. 15, 1969

3,438,296
FLYING SHEAR WITH ALTERNATELY OPERATIVE DRIVE MOTORS
Robert Hunter Ellis, Pittsburgh, and Peter Arvid Lund, Gibsonia, Pa., assignors to United Engineering and Foundry Company, Pittsburgh, Pa., a corporation of Pennsylvania
Filed Feb. 6, 1967, Ser. No. 614,350
Claims priority, application Great Britain, Feb. 25, 1966, 8,537/66
Int. Cl. B23d 25/02; B26d 1/56; F16h 37/06
U.S. Cl. 83—299                                9 Claims

ABSTRACT OF THE DISCLOSURE

This invention relates to a flying shear, including a drive for severing metallic workpieces, such as billets, bars, strip and the like, into predetermined lengths while such workpieces are traveling at a given speed and, more particularly, to an improved shear and drive for efficiently and effectively severing varying size workpieces at both high and low speeds.

---

Figure 1:
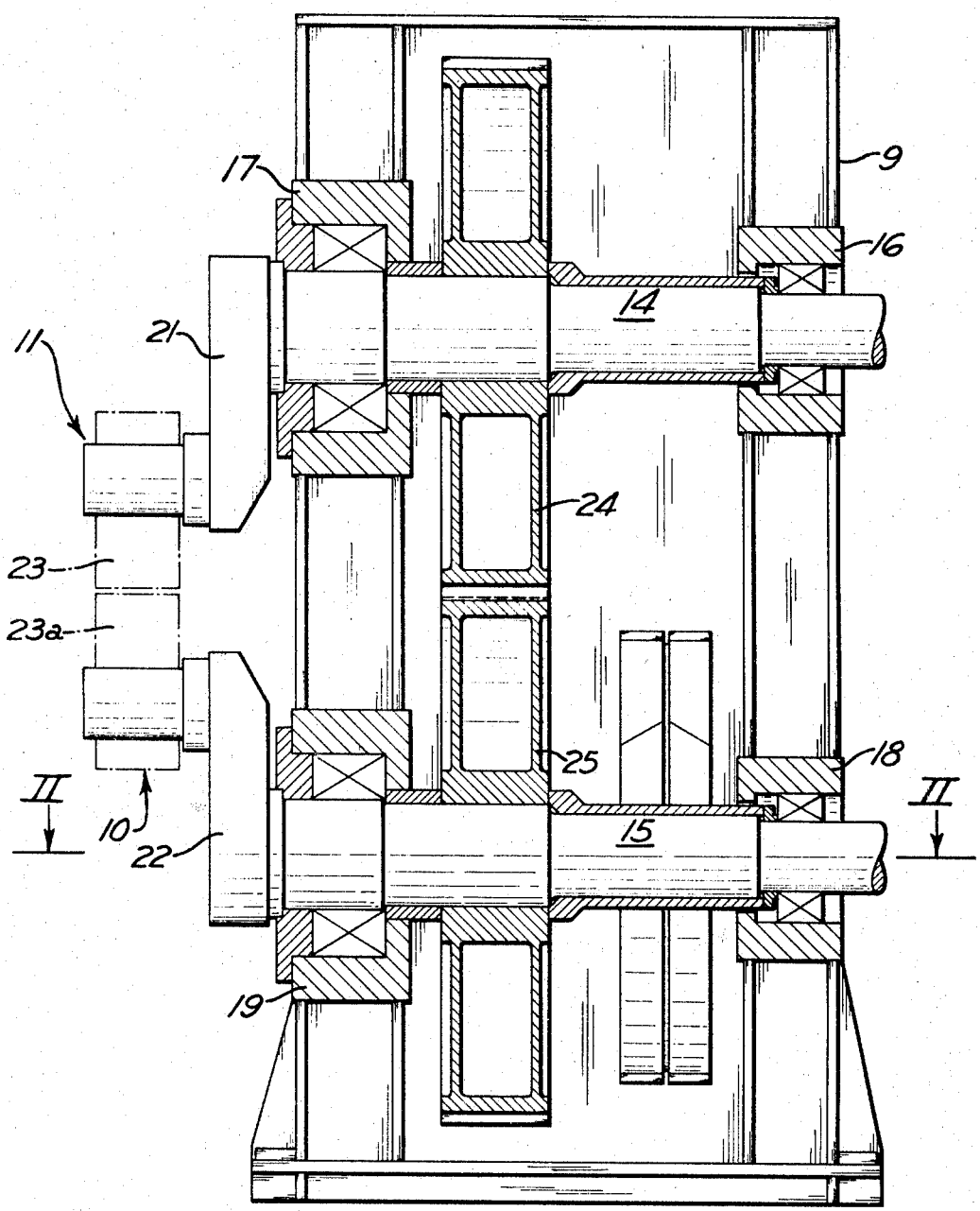

Shears of this type are employed to cut a short "crop end" portion from a bar, for example, and then divide the bar into a number of predetermined lengths while traveling at a given speed. The length of each sheared bar is a function of the speed of the shear knives between successive cuts. Moreover, it is a well-known practice and essential to the successful operation of the shear, to establish a synchronous speed relation between the bar and the shear knives during the time interval when the knives are in contact with the bar.

Present day requirements dictate that such a shear is required to sever bars having a small cross-sectional area while traveling at a high speed and then the same shear is required to sever bars having large cross-sectional areas while traveling at a slow speed. Most shears prior to the present invention were not capable of meeting these requirements, at least for a wide range of speeds and sizes, mainly because they were inherently incapable of supplying, in the time involved the necessary shearing energy, which for the large size bars could reach very large proportions.

One form of shear specifically designed to overcome the limitations of other prior shears is disclosed in U.S. Patent No. 2,425,484, issued on Oct. 12, 1947, to E. S. Murray, entitled, Electrically Driven Rotary Shear. This patent discloses a shear drive having a plurality of electric motors which are intricately controlled and correlated by an expensive and elaborate electrical system employed to vary the speed of the motors in an attempt to meet the aforesaid requirements. The length cut in this shear is varied by changing the voltage of the motors to accelerate or decelerate the shear between successive cuts wherein the workpiece moves at a constant rate.

Such a shear arrangement has certain disadvantages, one of which arises from the employment of a plurality of large expensive electric motors that are required to produce the necessary shearing force. Costly electrical equipment is also required for these motors in order that they may be constantly and quickly accelerated and decelerated by high currents to produce the desired length of bar. These disadvantages materially increase the initial, operating and maintenance costs of such a shear.

It is the principal object of the present invention to provide a shear for severing continuously advancing material, which shear can operate at relatively slow speeds for accurately severing large workpieces, or alternately at relatively high speeds for accurately severing smaller workpieces.

It is a further object of the present invention to provide a drive for a flying shear consisting of a primary and secondary drive train selectively connectable to the flying shear wherein, each drive train possesses large amounts of energy that remain substantially constant throughout the shearing cycle, thus enabling the number of motors to be reduced and the employment of smaller size motors.

According to one embodiment of the present invention, there is provided in combination with a flying shear for severing an elongated workpiece while traveling at a substantially constant speed, a drive for said shear made up of at least first and second drive trains adapted to be rotated at predetermined first and second speeds respectively which speeds remain substantially constant during any one shearing cycle, each drive train including the following elements: a clutch, means for connecting the output side of the clutch to said shear, an arbor connected to the input side of said clutch and having a flywheel mounted thereon, a motor connected to said arbor, the construction being such that said clutches are alternately actuated to establish a driving relation between said shear and either the first or second drive trains, said first drive train possesses sufficient energy when driven at said first speed and upon actuation of the clutch to effect a shear of the workpiece and establish a synchronous speed relation between said shear and the speed of the workpiece, and said second drive train possesses sufficient energy when driven at said second speed such that, upon actuation of the clutch, there is produced an acceleration or deceleration of the shear after shearing has been effected so as to vary the time between successive severing of the workpieces, hence vary the desired length of the severed workpieces.

Figure 2:
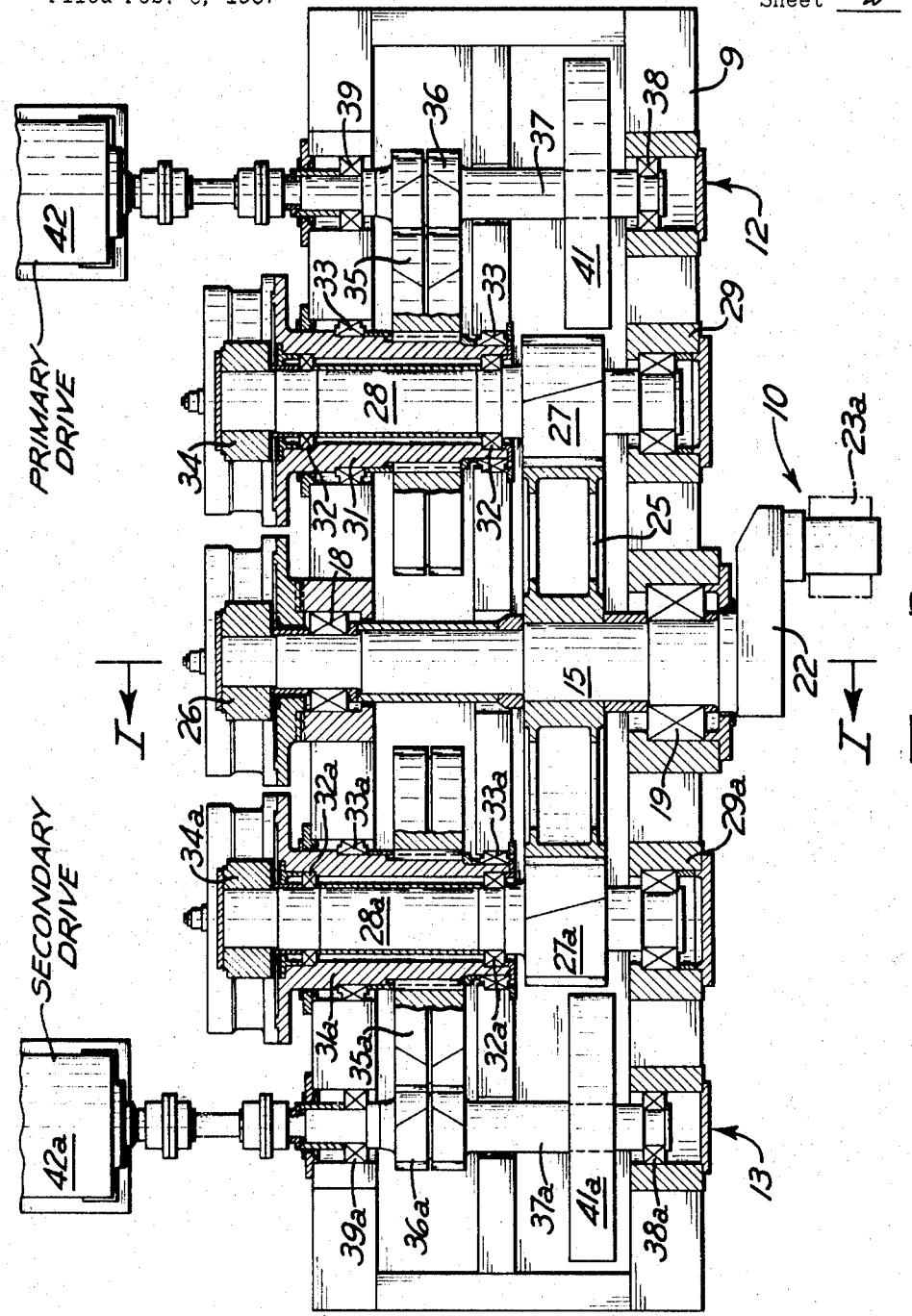
Figure 3:
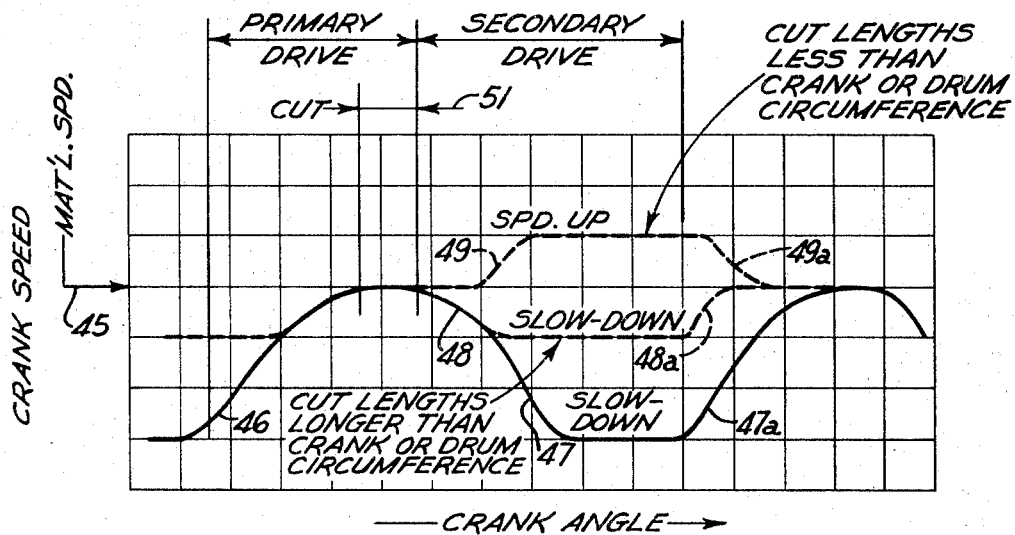
Figure 4:
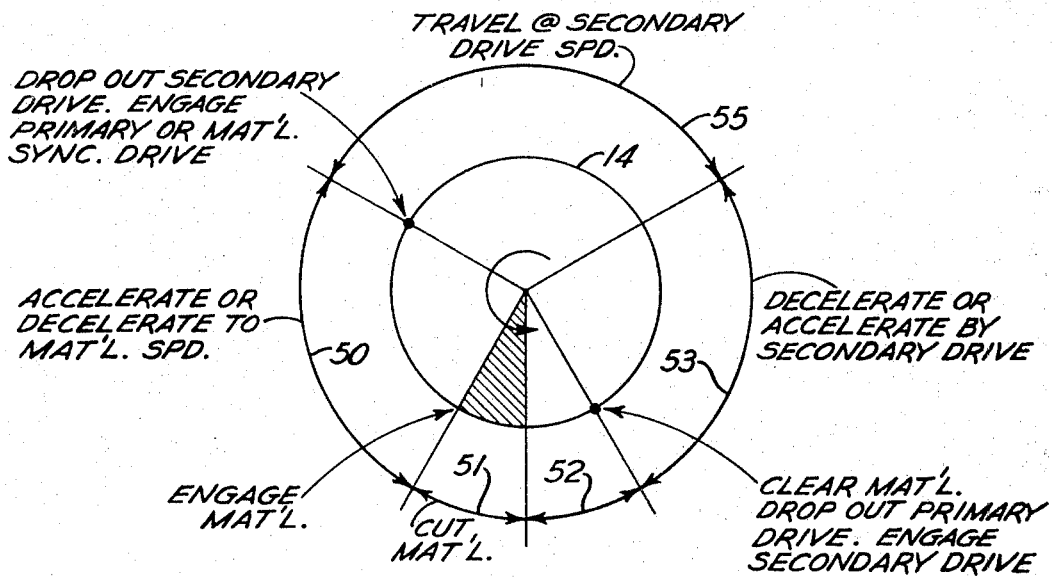

These objects, as well as various other features and advantages of the present invention, will become more apparent when the following description is read in conjunction with the accompanying drawings of which:

FIGURE 1 is a sectional elevational view taken along lines I—I of FIGURE 2 flying shear incorporating the features of the present invention, FIGURE 2 is a sectional plan view taken along lines II—II of FIGURE 1, FIGURE 3 is a graph illustrating certain relationships between the crank speed and the crank angle, and FIGURE 4 is a typical crank angular displacement diagram.

With reference now to FIGURES 1 and 2 there is illustrated a fabricated housing 9 adapted to rotatably support overhung shear heads 10 and 11 forming part of a flying billet-bar shear as well as two identical drive trains 12 and 13 hereinafter referred to as a primary drive and a secondary drive, respectively. With particular reference now to the flying shear and FIGURE 1, it essentially consists of spaced horizontally arranged crank shafts 14 and 15 which are rotatably supported at each end in the housing by conventional bearing block assemblies 16, 17 and 18, 19, respectively. The crank shafts 14 and 15 have eccentric end portions 21 and 22, respectively, onto which there is carried upper and lower shear knife heads 10 and 11 having knives 23 and 23a that cooperate together to sever a workpiece fed therebetween, which it should be noted will be traveling at a predetermined constant speed. To assure synchronous rotation of the crank shafts 14 and 15 and maintain a cooperative shearing relation between the shear knives, mounted on each of the crank shafts are intermeshing gears 24 and 25. As shown in FIGURE 2, a brake 26, employed to locate the shear knives in an initial or starting position, is secured to the end of the shaft 15 opposite the eccentric portion 22.

Rotation of the shafts 14 and 15 is accomplished by rotating the gear 25 by drive means now to be described. It will be appreciated that rotation of the gear 25 transmits rotation to the gear 24 to produce synchronous rotation of the shafts 14 and 15 and, hence, the knives 23 and 23a. At this juncture it is believed noteworthy to mention that while one form of a shear has been illustrated and described, various other types of shears may be employed with equal success without departing from the spirit of the present invention.

With reference again to FIGURE 2 and to the drive trains 12 and 13 illustrated therein, since both of these drive trains are identically constructed, a description of the train 12 employed as a primary drive train will be given, and reference numerals used to describe similar elements in the secondary train will carry a suffix of small case letters.

The primary drive train 12 consists of a pinion gear 27 secured on a shaft 28 which is rotatably mounted at one end by a bearing block assembly 29 in the housing 9. Sleeved over the other end of the shaft 28 is a tubular shaft 31 having bearings 32 therebetween to assure concentric relative rotation between these shafts. The shaft 31 is rotatably mounted by bearings 33 in the housing 9. A clutch 34 has an output side connected to the shaft 28 and an input side connected to the sleeve shaft 31. Mounted on the shaft 31 is a spur gear 35, which meshes with a pinion gear 36 formed on an arbor 37 that is in turn journaled by bearing block assemblies 38 and 39 in the housing 9. Mounted on the arbor 37 adjacent the bearing block assembly 39 is a large flywheel 41. A variable speed motor 42 is connected to the arbor 37 opposite the flywheel 41.

Operation of both the primary drive 12 and the secondary drive 13 is accomplished by energizing their respective motors which rotate the arbors 37, 37a and, hence, rotates the flywheels 41, 41a and the pinion gears 36, 36a. The latter cause rotation of the spur gears 35, 35a and the sleeved shafts 31, 31a, respectively. The rotary motion at this point is not transferred further until either of the clutches 34, 34a are actuated whereby the rotary motion is transferred to the shafts 28, 28a through the pinion gears 27, 27a to the gear 25 of the shear.

It is to be pointed out that the primary and secondary drives 12 and 13 each possess large amounts of energy by reason of their employment of their flywheels 41, 41a which have the effect of storing this energy. It is also to be pointed out that the primary drive motor 42 will be energized to the extent necessary to produce a rotary shear knife speed, when the clutch 34 is closed, synchronous to th lineal speed of the workpiece to be sheared. The drive motor 42a will be energized to the extent necessary to produce a rotary shear knife speed, when the clutch 34a is closed, either slower than or faster than the speed of the workpiece to be sheared. Thus it will be appreciated that by selectively actuating either of the clutches 34, 34a the speed of the knives will be proportional with the speed of the drive motors 42, 42a and that only a very minimal loss in the motor speed will be experienced due to an acceleration or deceleration of the shear by reason of the large amounts of energy that are stored in the respective drives. Thus in accordance with the present invention, the shear drive motors 42, 42a are not required to accelerate or decelerate except to restore energy in the drives which amount to a very small, inappreciable amount. This enables the employment of much smaller motors and eliminates the need of expensive associated electrical equipment including controls therefor and substantially reduces the overall operating and maintenance costs of the shear.

The coordination between the primary and secondary drives is more clearly illustrated in FIGURES 3 and 4. Before particularly describing FIGURE 3 it is believed to be noteworthy to mention first that horizontal lines in the graph represent a constant crank speed or zero acceleration and the sloping lines represent accelerations of the crank. Referring to the left-hand side of the graph, the constant speed of a workpiece is indicated at 45. The initial acceleration by the primary drive 12 of the crank is indicated at 46 and as the crank angle increases several other accelerations are indicated at 47, 48, 49 and 47a, 48a, and 49a, respectively. The acceleration at 46, as applied to the illustrated embodiment of the present invention, is accomplished by actuating the clutch 34 to engage the primary drive 12 with the shear 11 which run continuously at a predetermined speed controlled by the motor 42. This causes an acceleration in the crank without of any substantial loss in speed of the primary drive by reason of its stored energy. This acceleration ceases at the point where the crank speed is equal to the primary drive speed which corresponds to the lineal speed of the workpiece. The workpiece is then severed indicated by reference numeral 51 where throughout the duration of the cut it will be noted that the primary drive remains engaged with the shear. This makes available for the shearing operation the large amount of energy stored by the primary drive. This is particularly advantageous when large cross-sectional area workpieces are to be sheared at low speeds. After the cut is made, the clutch 34 is disengaged and the clutch 34a of the secondary drive is engaged. The shear is then either accelerated as indicated at 49 or the shear is decelerated as indicated at 47 and 48 to the predetermined speed of the secondary drive. This change in crank angle speed permits a lesser or greater length of workpiece to pass through the shear before the clutch 34a of the secondary drive is disengaged and the clutch 43 of the primary drive is engaged and the shearing cycle is repeated. At the start of the next shearing cycle an acceleration of the crank takes place as indicated at line 47a and 48a while at 49a a crank deceleration is produced.

With reference now to FIGURE 4 which, as previously indicated represents a typical crank angle displacement diagram, there is shown diagrammatically the angular displacement of the crank shaft 14, with respect to the employment of the first or second drive trains, which is indicated by the angular distance between the arrows. Starting first at the crank angle displacement where the crank is accelerated or decelerated to a speed consummate with the speed of the workpiece, this is indicated by reference numeral 50 and is accomplished by actuating the clutch 43 of the primary drive 12. As the crank rotates in a counterclockwise direction as one views FIGURE 4, it obtains an angular speed synchronous with the linear speed of the workpiece. The crank is then displaced an angular distance indicated by 51 and during this displacement time the workpiece is severed. Reference numeral 52 indicates a crank displacement during which the knives pass clear of the workpiece, the primary drive is disengaged and the secondary drive engaged. The crank then experiences an angular displacement indicated at 53 where it is accelerated or decelerated by the secondary drive. The displacement represented at 55 is the crank angle travel at the secondary drive speed which, while the secondary drive is rotated at a constant speed, it is controlled to vary the length of sheared workpiece. At the end of the angular displacement 55 the secondary drive is disengaged by releasing its clutch 34a and the primary drive is engaged by actuating its clutch 34 to accelerate or decelerate the crank for its next shearing cycle.

Thus it can be seen that the present invention provides a flying shear or like device while fully satisfies the aforementioned requirements in providing separate drive trains that are alternately employed to accelerate and decelerate the shear to effect shearing of a wide range of workpieces at speeds that may vary from workpieces to workpiece and which have the added advantage of being very economical and trouble-free in operation.

While one embodiment of the present invention has been illustrated, it is to be appreciated that its features can just as well be utilized in other related equipment such as, for example, a flying hot saw.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. Apparatus for severing into predetermined lengths an elongated workpiece while traveling at a substantially constant speed comprising:

severing means carried by a pair of shafts for arcuately displacing said means during a workpiece severing cycle wherein said means pass into and out of a severing relation with the workpiece, motor and flywheel means for providing first and second sources of torque which are continuous and substantially constant during the entire severing cycle, a first drive train including a first clutch for establishing a driving relation between said first source of torque and said shafts during said severing cycle wherein said severing means is caused to contact and sever the workpiece, said first drive train imparting a first speed to said shafts upon engagement of said first clutch to drive said severing means at a speed synchronous with said workpiece during that portion of said severing cycle when said severing means is brought into severing relation with the workpiece, a second drive train including a second clutch for establishing a driving relation between said second source of torque and said shafts during at least a portion of said severing cycle when said severing means is out of the severing relation with the workpiece, said second drive train imparting a second speed to said shafts upon engagement of said second clutch and disengagement of said first clutch to establish a desired speed relation between said shafts and workpiece, wherein said desired speed relation provides the desired severed length of a workpiece.

2. An apparatus according to claim 1, wherein said first and second drive trains each further comprise:

an arbor having a pinion gear mounted on said arbor, said flywheel means being carried by said arbor and said motor means being coupled to said arbor, a gear associated with said clutch and meshing with said pinion gear, said pinion gear and said gear being constructed to transmit torque at a reduced speed to said clutch.

3. Apparatus for severing into predetermined lengths an elongated workpiece while traveling at a substantially constant speed comprising:

a flying shear including a pair of cooperative shear knives for severing said workpiece, each of said shear knives being carried by a shaft whereby said knives are arcuately displaced during a shearing cycle into and out of a severing relation with the workpiece, a first drive train including a first clutch for selectively establishing a driving relation between said first drive train and said shafts, said first drive train also including a motor adapted to operate at a first predetermined speed and continuously during said entire shearing cycle, which speed upon the engagement of said first clutch produces a synchronous speed relation between said shear knives and said workpiece during at least that portion of said shearing cycle when the workpiece is being severed, said first drive train further including a flywheel associated with said motor for delivering to said shafts upon engagement of said first clutch a substantially constant torque for driving said shear knives with a sufficient torque to effect a severing of the workpiece, a second drive train including a second clutch for selectively establishing a driving relation between said second train and said shafts during a portion of the shearing cycle when the knives are out of the severing relationship, said second train including a motor adapted to operate continuously at a predetermined speed during said shearing cycle, which speed upon the engagement of said second clutch, controls the angular speed of the knives while out of a workpiece severing relation in said shearing cycle, said second drive train also including a flywheel associated with said motor for delivering a substantially constant torque to said shafts for accelerating or decelerating said knives from said first speed to said second speed, thereby to provide a desired time interval before a successive severing of the workpiece whereby the severed workpiece has a predetermined length.

4. An apparatus according to claim 3, wherein said first drive train and said second drive train further comprise:

first and second arbors each having a pinion gear mounted on said arbors, said first flywheel and said second flywheel being carried by said first and second arbors, respectively, and said first motor and said second motor being coupled to said first and second arbors, respectively, first and second gears associated with said first and second clutches, respectively, and meshing with said pinion gears of said first and second arbors, each meshing pinion gear and gear being constructed to transmit torque at a reduced speed to the clutch of the respective first and second drive trains.

5. Apparatus according to claim 3, wherein said second motor is constructed to provide variable speeds for establishing the said second predetermined speed, whereby the severed length of workpiece can be selectively varied from warkpiece to workpiece.

6. Apparatus according to claim 5, wherein said first motor is constructed to provide variable speeds for establishing said first predetermined speed, whereby said synchronous speed relation between said shear knives and said workpiece is maintained for workpieces traveling at different constant speeds.

7. An apparatus according to claim 4, further comprising:

a spur gear secured to each of said shafts carrying said shear knives, said gears being arranged on said shafts in a meshing relation to provide synchronous arcuate displacement of said shear knives.

8. An apparatus according to claim 7, wherein one of said spur gears meshes with:

first and second pinion gears each rotatably carried by an arbor shaft, said arbor shaft of said first pinion gear being connected to said first clutch for receiving torque from said first drive upon engagement of the first clutch, said arbor shaft of said second pinion gear being connected to said second clutch for receiving torque from said second drive upon engagement of the second clutch.

9. An apparatus according to claim 8, further comprising:

brake means associated with one of said shafts carrying said shear knives for stopping and positioning said shear knives in an initial starting position.

(References on following page)

References Cited

UNITED STATES PATENTS

| | | | |
|---|---|---|---|
| 1,876,456 | 9/1932 | Iversen et al. | 83—311 |
| 2,180,599 | 11/1939 | Menasco | 74—661 X |
| 2,781,674 | 2/1957 | Kaerger | 74—661 |
| 2,902,875 | 9/1959 | Finally et al. | 74—661 X |
| 3,176,557 | 4/1965 | Drenning et al. | 83—324 X |

FOREIGN PATENTS 570,307　2/1959　Canada.

ANDREW R. JUHASZ, *Primary Examiner.*

F. T. YOST, *Assistant Examiner.*

U.S. Cl. X.R.

83—324; 74—661